No. 746,608. PATENTED DEC. 8, 1903.
A. S. VAN DENBURGH.
EYEGLASS FRAME.
APPLICATION FILED APR. 2, 1903.
NO MODEL.
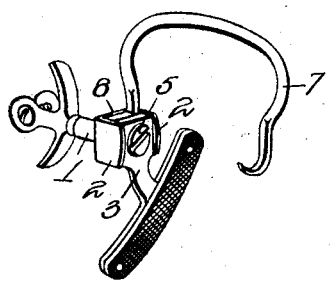
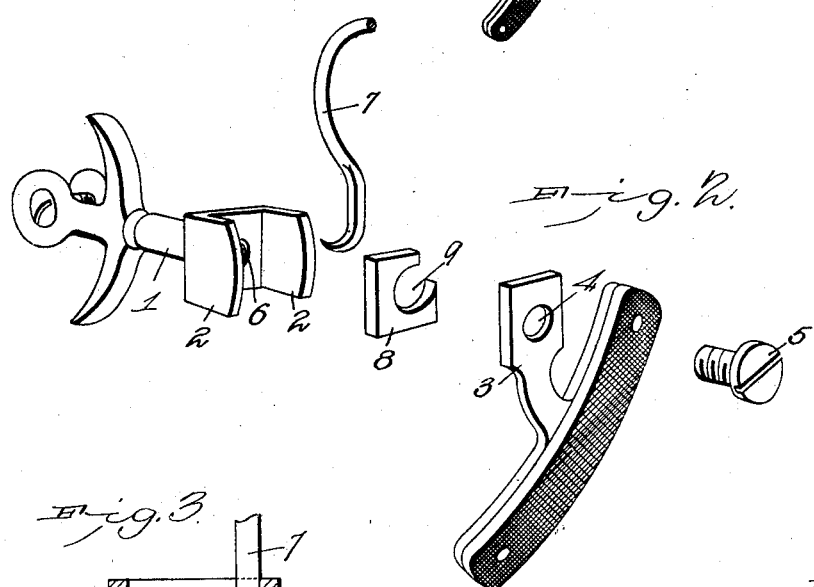
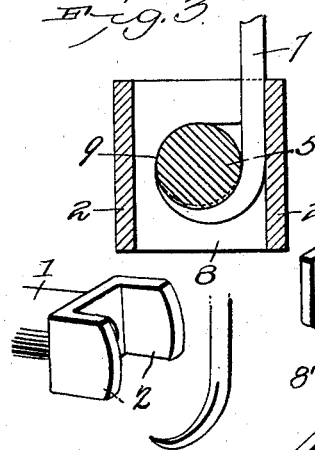
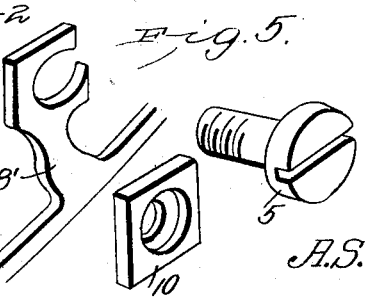
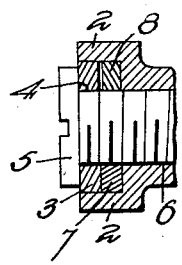

No. 746,608. Patented December 8, 1903.

UNITED STATES PATENT OFFICE.

ALBERT STEVENS VAN DENBURGH, OF WORCESTER, MASSACHUSETTS.

EYEGLASS-FRAME.

SPECIFICATION forming part of Letters Patent No. 746,608, dated December 8, 1903.

Application filed April 2, 1903. Serial No. 150,789. (No model.)

*To all whom it may concern:*

Be it known that I, ALBERT STEVENS VAN DENBURGH, a citizen of the United States, residing at Worcester, in the county of Worcester and State of Massachusetts, have invented a new and useful Eyeglass-Frame, of which the following is a specification.

The present invention relates to improvements in eyeglass-frames, and has for its principal object to provide improved means for securing the spring member to the nose-guard and stud whereby a piece of ordinary spring-wire of any suitable material and any shape in cross-section may be used in place of the usual flat-strip springs now commonly employed.

A further object of the invention is to provide an improved frame in which the spring member while locked in position by the usual screw serves also as a clamp or locking device for holding the screw in position.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a portion of an eyeglass-frame embodying the invention. Fig. 2 is a similar view showing the various parts detached. Fig. 3 is an enlarged sectional elevation through the outer portion of the stud member, illustrating the manner in which the wire spring is held in place. Fig. 4 is a sectional plan view of the same on the line 4 4 of Fig. 3. Fig. 5 is a perspective view illustrating a slight modification of the invention.

Similar numerals of reference are employed to indicate corresponding parts throughout the several figures of the drawings.

The stud member 1 is of the usual construction and provided at its outer end with a pair of parallel flanges 2 to assist in holding the spring and nose-guard in place. In these devices as ordinarily constructed the nose-guard member 3 is provided with an opening 4 for the passage of a securing-screw 5, which extends through the opening 4, thence through the spring, and then into a threaded opening 6 in the stud.

In carrying out the invention the stud and nose-guard members are of the ordinary construction; but in place of the usual flat-strip spring we employ a simple wire spring 7, which may be of round or any other shape in cross-section, the ends, however, being preferably rectangular in cross-section, as shown in Fig. 4. The wire is partly held in position by a small plate 8, having an opening 9 for the passage of the securing-screw 5, and one side of the upper portion of the plate is cut away from the top of the plate to a wall of the opening to afford a passage for the end of the spring 7. The opening is somewhat elongated, and its wall if continuous would describe an ellipse, so that between the inner face of one of the flanges 2 and the periphery of the screw 5 there is formed a gradually-contracted opening for the reception of the end of the spring. The diameter of the spring is preferably a trifle greater than the thickness of the plate 8, as shown on an exaggerated scale in Fig. 4, so that when the screw is passed through the nose-guard member and the opening 9 the nose-guard plate acts as a clamp to hold the spring in position, the nose-guard plate being slightly bowed by the forcing of the screw to position and securely holding the end of the spring in place.

On reference to Fig. 3 it will be noticed that the end portion of the spring is held against the periphery of the screw by the tapering opening between the screw and the curved wall of the opening 9, the spring engaging the threads of the screw and clamping thereagainst to prevent any accidental loosening of said screw.

In some cases the end of the nose-guard 3 may be shaped in such manner as to form the plate 8, as shown at 8' in Fig. 5, thus dispensing with an extra piece. In such cases a recessed plate 10 is preferably employed to clamp against the outer face of the spring, the recess serving to receive the head of the screw, or in some cases the recessed plate may be dispensed with and the head of the screw forced into direct engagement with the spring.

In practice I may employ spring-wire of any desired contour in cross-section, and by utilizing the end of the spring and side of the perforated plate or guard as a screw-locking device the annoyance incident to the constant loosening of these screws will be avoided.

Having thus described the invention, what is claimed is—

1. The combination with a flanged stud, of a spring having a curved lower end, a nose-guard member, and a securing-screw extending through the nose-guard and into the stud at one side of the spring, the spring being clamped between the outer face of the stud and the adjacent face of the nose-guard and being further held by engagement of its curved end with the threaded peripheral portion of the screw.

2. The combination with a flanged stud, of a nose-guard member, a spring and a perforated plate disposed between the stud and said nose-guard member, said spring being of a diameter slightly greater than the thickness of the plate, and a screw for clamping the nose-guard member against said spring.

3. The combination with a flanged stud and nose-guard member, of a perforated plate disposed between the two and having a portion of one of its sides cut away to form a spring-receiving recess, a securing-screw, and a spring confined in the receiving-recess and bearing against the periphery of the screw.

4. The combination with a flanged stud and a nose-guard member, of a perforated plate arranged between the two, there being a spring-receiving opening formed at one side of the plate, a spring adapted to said opening, and a screw extending through the nose-guard member, the plate and the stud, the threads of the screw engaging the end of the spring to thereby lock the screw in position.

5. In an eyeglass-frame, the combination with a stud and nose-guard member, of a spring formed of a section of wire, each end of the spring being confined between a stud and nose-guard member.

6. The combination with a flanged stud and a nose-guard member, of a perforated plate arranged between the two and cut away at one side to form a tapering opening for the reception of a spring, a clamping-screw, and a spring confined in the opening and held by the tapering wall thereof in engagement with the periphery of the screw.

In testimony that I claim the foregoing as my own I have hereto affixed my signature in the presence of two witnesses.

ALBERT STEVENS VAN DENBURGH.

Witnesses:
ALMER D. BROWN,
BEATRICE M. BROWN.